United States Patent [19]

Liebermann et al.

[11] Patent Number: 4,734,256
[45] Date of Patent: Mar. 29, 1988

[54] WETTING OF LOW MELTING TEMPERATURE SOLDERS BY SURFACE ACTIVE ADDITIONS

[75] Inventors: Howard H. Liebermann, Succasunna; Debasis Bose, Randolph, both of N.J.

[73] Assignee: Allied-Signal Inc., Morris Township, Morris County, N.J.

[21] Appl. No.: 854,455

[22] Filed: Apr. 21, 1986

[51] Int. Cl.$^4$ .............................................. C22C 11/06
[52] U.S. Cl. ................................. 420/571; 420/570; 428/606
[58] Field of Search .............. 420/563, 570, 571, 572; 75/251, 255; 428/606

[56] References Cited

U.S. PATENT DOCUMENTS

| | | | |
|---|---|---|---|
| 2,107,223 | 2/1938 | Swartz | 420/571 |
| 2,620,367 | 12/1952 | Brown | 420/570 |
| 3,644,115 | 2/1972 | Hamaguchi et al. | 420/570 |
| 3,664,831 | 5/1972 | Graefen | 420/570 |
| 3,793,161 | 2/1974 | Manko | 420/570 |

FOREIGN PATENT DOCUMENTS

| | | |
|---|---|---|
| 0015019 | 2/1980 | European Pat. Off. . |
| 0111728 | 11/1983 | European Pat. Off. . |
| 0207236 | 1/1987 | European Pat. Off. . |
| 2452842 | 5/1976 | Fed. Rep. of Germany ...... 420/570 |
| 2500228 | 7/1976 | Fed. Rep. of Germany ...... 420/563 |
| 2826590 | 1/1980 | Fed. Rep. of Germany . |
| 2928455 | 1/1980 | Fed. Rep. of Germany . |
| 3042011 | 6/1982 | Fed. Rep. of Germany . |
| 19521 | 11/1966 | Japan ...... 420/563 |
| 23427 | 10/1969 | Japan ...... 420/570 |
| 17625 | 9/1972 | Japan ...... 420/570 |
| 26580 | 8/1973 | Japan ...... 420/563 |
| 28248 | 8/1973 | Japan ...... 420/570 |
| 473781 | 10/1937 | United Kingdom ...... 420/572 |
| 508604 | 7/1939 | United Kingdom ...... 420/570 |

Primary Examiner—L. Dewayne Rutledge
Assistant Examiner—Robert L. McDowell
Attorney, Agent, or Firm—Ernest D. Buff; Gerhard H. Fuchs; Gus T. Hampilos

[57] ABSTRACT

A lead based alloy is modified by adding thereto a surfactant consisting of about 0.01 to 0.5 weight percent tellurium, about 0.01 to 0.5 weight percent selenium, about 0.01 to 0.5 weight percent selenium plus about 0.1–0.5 weight percent antimony, and mixtures thereof. The alloy is rapidly solidified by forming a melt thereof containing the surfactant addition and quenching the melt on a moving chill surface at a quenching rate of at least about $10^3$ C./sec. Addition of the surfactant lowers melt surface tension and thereby promotes improved wetting.

5 Claims, 3 Drawing Figures

WETTING OF LOW MELTING TEMPERATURE SOLDERS BY SURFACE ACTIVE ADDITIONS

1. Field of the Invention

This invention relates generally to an improvement of the wetting behavior of a commonly used soldering alloy and to the use of such an alloy for the joining electronic components particularly for the soldering semiconductor devices to metal or ceramic substrates.

2. Description of the Prior Art

Soldering is a process for the metallurgical bonding of two materials which often have dissimilar compositions. The process of soldering is used for joining a transistor or other semiconductor device (die or chip) to a metal or ceramic part (lead frame or header) to provide mechanical support to the device. This operation is commonly referred to as die attachment. Typically, a filled metal having a melting point lower than that of the base material parts to be joined is interposed between the metal parts to form an assembly. The assembly is then heated to a temperature sufficient to melt the filler metal. Upon cooling, a sound, leak-tight joint is formed. Joining performed in this manner is commonly referred to as "furnace mounting". The use of an alternative method of joining, referred to as "automatic die bonding," is becoming widely used in the industry because of its greater throughput. In the automatic die bonding technique, the lead frame or header is pre-heated to the desired soldering temperature under an inert or reducing gas atmosphere. A solder preform is then dropped onto the hot lead frame or header. Melting of the preform occurs almost instantaneously. The silicon die is then dropped onto the molten solder and a small load applied on the die in order to squeeze out the enrapped gas at the die/solder and solder/lead frame interfaces. The assemblies are then cooled under controlled atmosphere.

One of the solder alloys commonly used for die attachment has the composition Pb-5Sn (wt. %). Joints made using this alloy are strong and provide adequate resistance against thermal fatigue during the operation of devices. Commonly, this alloy is used in foil or wire forms. One of the problems with the use of such a foil, particularly when used in automatic die bonding equipment, is its non-wetting or dewetting tendency. That is, the preform retracts into a ball form after melting on the hot lead frame or header in automatic die bonding equipment. This phenomenon is the result of non-wetting, partial wetting or dewetting of the solder alloy. If a silicon die is joined to a partially-wetted or dewetted solder alloy, the resultant joint can contain pores and voids, resulting in poor performance of the device. Ideally, the solder preform, after being dropped on the hot lead frame, should melt and flow to exceed the original size of the solid preform, thereby indicating good wetting and spreading characteristics. Joints made with a properly-wetting solder alloy will be sound and, therefore, will exhibit superior properties.

There remains a need in the art for an improvement of the wetting characteristics of Pb-Sn solders.

SUMMARY OF THE INVENTION

The present invention provides Pb-Sn solder compositions having improved wetting characteristics. The improvement in the wetting characteristics has been accomplished by small additions of a surfactant consisting of one or more than one element from the group consisting of Sb, Se and Te. Generally stated, the alloys of the present invention contain about 4–17 wt. % Sn and at least one member selected from the group consisting of xTe and/or ySb+zSe, where x varies from about 0.01 to 0.5 wt. %, y varies from about 0.1 to 0.5 wt. % and z varies from about 0.01 to 0.5 wt. %, the balance of all these compositions being Pb and incidental impurities. Since the alloys of the present invention contain substantial amount of Sn (about 4 to 17 wt. %), which has limited solid solubility in Pb, conventional solidification of molten metallic alloys of the present invention results in compositional segregation. Solder foils with such a segregated structure may require a higher soldering temperatures and/or a longer times to reflow than microstructurally homogeneous solder foil. The preferred method of producing microstructurally homogeneous foils from the alloys of the present invention is that of rapid solidification on a moving chill surface. Foils produced in this manner are microcrystalline and chemically homogenous. Other techniques such as rolling, casting, powder metallurgical techniques or drawing can be used to fabricate these alloys into foil or wire forms. The alloys of the present invention can also be produced in powder form by melt atomization or by mechanical communition of a foil composed thereof.

In addition, the invention provides a process for joining together two or more parts comprising the steps of:

(a) interposing a filler metal foil between the parts to be joined to form an assembly, the filler metal foil having a melting temperature less than that of any of the parts to be joined;

(b) heating the assembly to at least the melting temperature of the filler metal, and cooling the assembly, wherein the improvement comprises employing as the filler metal at least one homogenous soldering foil produced by melting an alloy, the composition of which consists essentially of about 4–17 wt. % Sn, and a surfactant consisting of at least one member selected from the group consisting of x Te and/or ySb+zSe, where x varies from about 0.01 to 0.5 wt. %, y varies from about 0.1 to 0.5 wt. % and z varies from about 0.01 to 0.5 wt. %, the balance of all these compositions being Pb and incidental impurities and quenching the alloy on a rapidly moving chill surface at a rate of at least about $10^{3°}$ C./sec.

Alternatively, the joining operation can be performed by a process comprising the steps of:

(a) placing a filler metal on one of the parts to be joined to form as assembly, the filler metal having a melting temperature less than that of any of the parts to be joined;

(b) heating the assembly to at least the melting temperature of the filler metal;

(c) placing a second of the parts to be joined on the molten filler metal; and (d) cooling the assembly, the filler metal being at least one homogenous soldering foil produced by the process described in the preceding paragraph.

DETAILED DESCRIPTION OF THE INVENTION

Figure 1:

A solder alloy of composition Pb-5Sn (wt. %) is commonly used for die attachment. One of the problems with the use of such a foil, particularly when used in automatic die bonding equipment, but not by way of limitation, is its non-wetting or dewetting behavior when the solder preform is dropped on the preheated lead frame. Joining conducted using such non-wetting or dewetting molton solder exhibit voids in the joint. Ideally, the solder preform, after being dropped on the hot lead frame, should melt and flow, exceeding the original size of the solid preform, thereby indicating adequate wetting.

The present invention claims an improvement of the wetting behavior of Pb-Sn alloys by small additions of one or more than one of the elements from the group consisting of Se, Sb and Te. Generally stated, the alloys of the present invention contain about 4-17 wt. % Sn and a surfactant consisting of at least one number selected from the group consisting of x Te and/or y Sb+z Se, where x varies from about 0.01 to 0.5 wt. %, y varies from about 0.1 to 0.5 wt. % and z varies from about 0.01 to 0.5 wt. %, the balance being Pb and incidental impurities.

Additionally, in any soldering process, particularly when used for die attachments, the soldering foil should preferably be chemically homogenous and should be free of organic contaminants. The term "chemically homogeneous," as used herein with respect to the soldering foil of the invention, means that all individual phases within the foil, having a composition different from that of the matrix, are smaller than about 0.5 micrometer. More generally stated, the term "chemically homogeneous" means that the foil, as produced, is of substantially uniform composition throughout its volume. A chemically homogeneous joint is usually achieved when the foil used for soldering is chemically homogenous. Soldered joints should also be sound, i.e., should be free of voids and pores. A sound, chemically homogeneous soldered joint exhibits superior mechanical properties compared with a joint which contains voids and which is chemically inhomogeneous. Conventionally, the soldering foils are produced by conventional metalworking techniques in which a billet or ingot is repeatedly rolled and annealed until the desired thickness of the foil is obtained. Phases, segregated within the billet or ingot, are thus transferred to the final product. In addition, grease or oil commonly used as lubricants during metalworking tends to become entrapped in the foil. During melting, the organic contaminants outgas, acting as a source for voids in the joint.

The soldering foils of the present invention are prepared by cooling a melt of the desired composition at a rate of least about $10^3$° C./sec., through metallic alloy rapid quenching techniques, as discussed in U.S. Pat. No. 4,331,739. The purity of all compositions is that found in normal commercial practice.

EXAMPLE 1

Ribbon about 3.175 mm (0.125") wide and about 13 to 76 m (about 0.0005 to 0.003 inch) thick were formed by the deposition of a melt stream of the particular composition onto a rapidly rotating chill wheel (surface speed about 1200 to 6000 ft/min) by pressurization with argon gas. Homogenous ribbons having compositions set forth in Table I were produced.

TABLE I

| Sample No. | Composition (wt. %) | | | | |
| --- | --- | --- | --- | --- | --- |
| | Pb | Sn | Sb | Se | Te |
| 1 | Bal | 5 | — | — | — |
| 2 | Bal | 5 | 0.1 | 0.05 | — |

TABLE I-continued

| Sample No. | Composition (wt. %) | | | | |
| --- | --- | --- | --- | --- | --- |
| | Pb | Sn | Sb | Se | Te |
| 3 | Bal | 5 | 0.5 | 0.05 | — |
| 4 | Bal | 5 | 0.3 | 0.05 | — |
| 5 | Bal | 5 | 0.1 | 0.5 | — |
| 6 | Bal | 5 | 0.5 | 0.5 | — |
| 7 | Bal | 5 | — | — | 0.05 |
| 8 | Bal | 5 | — | — | 0.5 |
| 9 | Bal | 15 | — | — | — |
| 10 | Bal | 15 | 0.4 | — | — |
| 11 | Bal | 15 | 0.4 | 0.07 | — |

EXAMPLE 2

Wetting behavior of ribbon lengths from Samples 1, 4 and 7 was determined immediately after casting in the manner described below.

Small preforms were first cut from Sample No. 1, 4 and 7. Electroless Ni-plated TO-3 header substrates were then heated to about 360° C. under an Ar+4% $H_2$ atmosphere using a manual die bonding equipment. The solder preforms were then individually dropped on the preheated headers. Melting of preforms occured almost instantaneously. Wetting behavior of preforms were characterized under a stereomicroscope. A "good" wetting behavior of a preform is defined when the preform spreads accross the surface after melting. A "bad" wetting behavior is defined when the preform after melting retracts (or "pulls back"). Results of wetting test are set forth in Table II below.

TABLE II

| Sample No. | Wetting Behavior |
| --- | --- |
| 1 | Bad |
| 4 | Good |
| 7 | Good |

EXAMPLE 3

In order to further demonstrate the beneficial effects of Se additions on improving wetting of Pb-5Sn (wt. %) alloy, tests were conducted using commerically available rolled foil (which will henceforth will be referred to as "as-received rolled foil). The rolled foil was first chemically analyzed and was found to contain about 0.3 wt. % Sb; no Se was detected.

Figure 2:
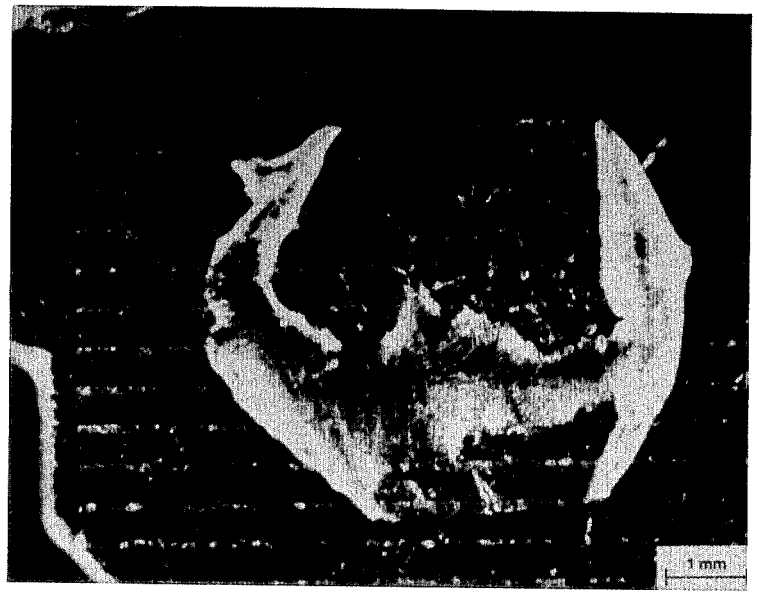
Figure 3:
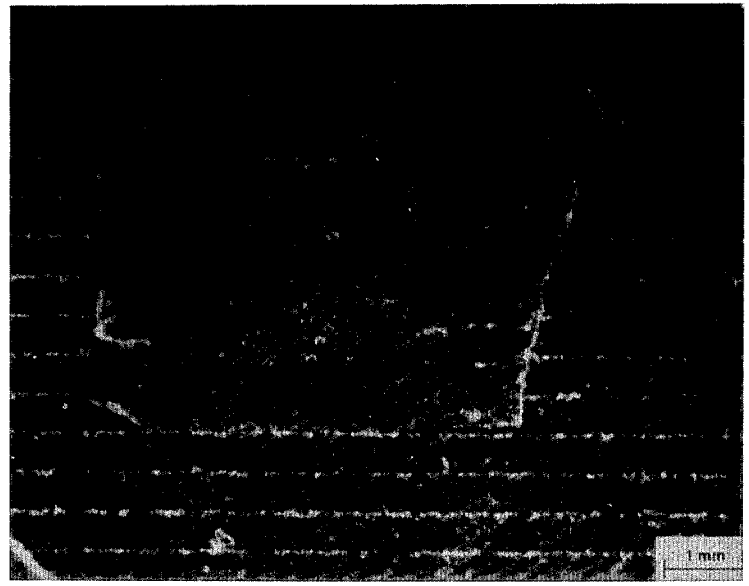

About 50 g of the commercial rolled foil was melted and cast into foil form by rapid solidification (henceforth will be referred to as "recast rolled foil"). Then, about 50 g of rolled foil was melted and about 0.025 g of Se (0.05 wt %) was added. This molten alloy was cast into foil form by rapid solidification (henceforth will be referred to as "recast rolled foil with Se"). Wetting behavior of the "as received rolled foil," "recast rolled foil" and "recast rolled foil with Se" was evaluated in an identical manner as described in Example-1. FIG. 1 is a photograph of a molten and resolidified as-received rolled foil preform. It is evident from FIG. 1, that the preform pulled back significantly after melting, indicating dewetting. FIG. 2 illustrates the melting behavior of recast rolled foil. Here also, the molten and resolidified preform pulled back significantly, indicating dewetting. The molten and resolidified recast rolled foil with Se, on the other hand, did not pull back at all, as shown in FIG. 3. These experiments, therefore, demonstrate improvement of wetting behavior Pb-5Sn (wt. %) composition by Se addition.

EXAMPLE 4

Wetting behavior of ribbon lengths from Samples 9, 10, and 11 was determined immediately after casting, as described in Example 2. While all samples bonded well to the TO-3 header substrates, wetting behavior was found to improve with the addition of antimony and selenium, as set forth in Table III below. In addition, Table III gives data in which shear strength of the solder joint is significantly increased with the addition of both antimony and selenium.

TABLE III

| Sample No. | Wetting Behavior | Shear Strength, N |
|---|---|---|
| 9 | dewetted 15%, 20%, and 30% | 105, 123 |
| 10 | dewetted 10%, 10%, and 5% | 100, 100 |
| 11 | no dewetting | 115, 163 |

Having thus described the invention in rather full detail, it will be understood that such detail need not be strictly adhered to but that further changes and modifications may suggest themselves to one skilled in the art, all falling within the scope of the present invention as defined by the subjoined claims.

We claim:

1. A rapidly solidified lead base solder alloy in strip form comprising between about 4 and about 17 weight percent tin, the improvement comprising adding to said alloy a surfactant consisting of at least one member selected from the group consisting of about 0.01 to 0.5 weight percent tellurium, about 0.01 to 0.5 weight percent selenium plus about 0.1 to 0.5 weight percent antimony, and mixtures thereof, to promote wetting of substrates by said alloy.

2. An alloy as recited in claim 1, having the form of a foil.

3. An alloy as recited in claim 2, wherein said foil is fuctile.

4. A metal alloy composition as recited in claim 2, wherein said structure is homogeneous.

5. An alloy as recited in claim 1, having the form of a wire.

* * * * *